Patented Nov. 12, 1929

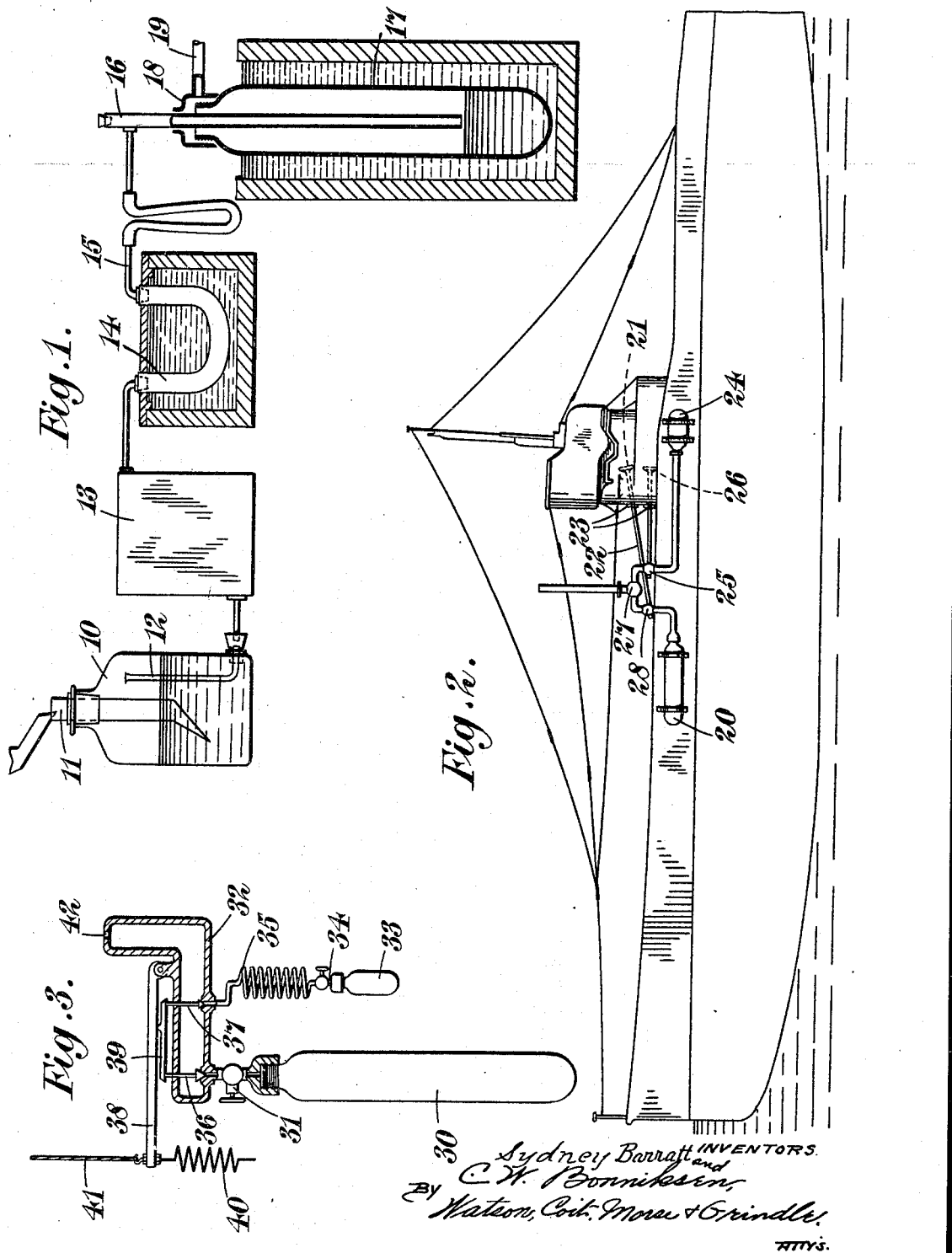

1,735,373

UNITED STATES PATENT OFFICE

CYRIL WILFRED BONNIKSEN AND SYDNEY BARRATT, OF LONDON, ENGLAND

PRODUCTION OF FLAME OR SMOKE FOR SIGNALING

Application filed November 22, 1926, Serial No. 150,045, and in Great Britain November 30, 1925.

This invention comprises improvements in or relating to the production of flame or smoke for signaling, smoke-screen and like purposes at sea or on land. One important application of the invention is to signaling from submarine vessels.

It is well known that effective smoke screens, signals and the like can be made at sea from surface vessels by generating phosphine gas ($PH_3$) in situ by the action of calcium phosphide distributed on the surface of the sea. There are, however, objections to the employment of calcium phosphide, which has to be kept rigidly out of contact with water, if danger from explosions is to be avoided.

It has not hitherto been generally appreciated that although phosphine is a highly inflammable substance it is sufficiently stable, when kept out of contact with air, to be stored under pressure with perfect safety. According to the present invention a method of producing flame or smoke, for the purpose of signaling or for smoke screens or like purposes, is characterized by releasing phosphine from storage under pressure (for example storage in the liquid state) into the atmosphere, under such conditions as to cause combustion of the gas.

The phosphine may be released either by hand or by automatic apparatus under predetermined conditions e. g. from a buoy or other floating object, when this becomes adrift or when, for other reasons, it is desirable to increase its visibility.

It is highly desirable in marine signaling to have some method available which permits of visible signals being made upon the surface of the sea from submerged points of release, and especially is this desirable in the case of submarine vessels, which when wholly submerged are ordinarily unable to effect such communication with the surface as to indicate the position of the vessel.

Accordoing to a further feature of the present invention the phosphine may be released under water (for example from a submarine vessel) so that it rises to the surface of the water, there ignites and indicates the position of the submerged object from which it has been released.

According to a further feature of the present invention an activating agent is diffused in the phosphine when released, so as to be carried therewith into the atmosphere and to ensure combustion.

When the phosphine is stored in the liquid state the activating agent may be a substance soluble in liquid phosphine (for example elementary phosphorus or $P_2H_4$) and may be dissolved in the phosphine so as to be released therewith and thus diffused in the issuing gas.

Again, the activating agent (for example, an active oxygen containing nitrogen compound such as NO) may be diffused into the phosphine upon issue of the phosphine as a gas from storage.

The following is a description of one method of preparation of gas for use according to the invention and of examples of apparatus by which the invention may be carried into effect when employed on a submarine vessel.

In the accompanying drawings,

Figure 1 is a diagram of the apparatus necessary for producing and storing the gas.

Figure 2 is a diagram of one application of the invention in a submarine vessel, and Figure 3 is a diagrammatic representation of a mixing apparatus for the gas and activator.

The phosphine gas may be generated by the action of water or acids on metallic phosphide such as calcium phosphide in any suitable apparatus such as an acetylene-gas generator from which air has been excluded. Such apparatus is indicated in Figure 1 by a vessel 10 containing water, with an inlet tube 11 for calcium phosphide and a gas outlet 12. The gas is passed from the outlet 12 through a drying apparatus 13 which may for example contain calcium chloride. From the drying apparatus 13 the gas passes into a U-tube 14 which is immersed in carbon dioxide snow. This has the effect of cooling the gas sufficiently to condense $P_2H_4$ and free the gas of this undesirable impurity. From 14 the gas is led through a tube 15 to a pipe 16 which depends into a collecting cylinder 17. The cylinder 17 is immersed in a bath of liquid air, and here the phosphine condenses. The pipe 16 passes through a bell 18 with which it makes a gas-tight joint and the bell 18 closes over the mouth of the cylinder 17. An outlet pipe 19 leads from the bell and can be led under water to show whether any gas is escaping uncondensed.

When a sufficient quantity of phosphine has thus been collected in the cylinder 17 the pipe 16 may be removed and a valve cap screwed on in its place. It is important not to fill the cylinder too full, as the solid phosphine collected expands considerably on liquefication. About one-quarter full is sufficient. Another cylinder may then be substituted and the process continued. The pressure rises in the cylinder 17 after the valve has been closed as the gas gradually attains atmospheric temperature, and the cylinders employed must be strong enough to resist this rise of pressure. They may be lined with some inactive material, such as vitreous enamel, to prevent possible chemical action when the liquid is stored for considerable periods of time.

Nitric oxide is the preferred activating agent. The nitric gas may be stored under high pressure in a separate cylinder and mixed, upon use, in a suitable mixing valve connected to both cylinders.

It is found that phosphine, stored in a liquid state in the manner described, is not self-igniting apart from an activating agent and, therefore, if stored separately it is comparatively safe.

For use with a submarine vessel, a cylinder of the liquid phosphine is secured upon the outside of the vessel as shown at 20, Figure 2, and means are provided for operating the valve 28 of the cylinder from the interior of the vessel by a hand wheel 21 upon a spindle 22 which passes through a stuffing box 23. Upon release of phosphine, bubbles of the gas rise through the water and ignite spontaneously on the surface.

The activating agent is stored in a separate cylinder 24 provided with a release valve 25 operated by a hand wheel 26. A suitable proportion of the nitric gas is released and mixed with the phosphine at the junction 27 of the pipes from the release valves 25 and 28.

The release may alternatively be controlled by some automatic device which may be arranged to operate under predetermined conditions. For example, small quantities of phosphine may be released at predetermined intervals; again, phosphine may be released at the end of a predetermined period of time, or upon the pressure external to the vessel, rising sufficiently; then again, the arrangement may be such that phosphine is released consequent upon the dissolution of some soluble retaining-member which normally prevents the release of the gas. With this latter device a signal could automatically be given upon the flooding of a vessel or compartment thereof.

Referring to Figure 3, 30 represents a cylinder of liquid phosphine which is connected through a hand valve 31 to a mixing chamber 32. A cylinder of nitric oxide 33 is also connected to the mixing chamber 32 through a hand valve 34 and a long capillary tube 35. The exit from the cylinder 30 is further controlled by a needle valve 36 and from the cylinder 33 by a needle valve 37. The needle valves 36 and 37 are forced on to their seats by a lever 38 which acts through an equalizing lever 39 upon the stems of the needle valves. A spring 40 holds the valves closed and an operating cord 41 serves to open them. The length and diameter of the capillary tube 35 are so calculated that only a very small proportion of nitric oxide will escape from the activating cylinder 33 when the needle valve 37 is opened, compared with the volume of phosphine escaping from the cylinder 30. The gases mix in the chamber 32 and issue through an outlet 42 therefrom and as soon as they come into contact with air they spontaneously ignite.

The operating cord 41 may be actuated automatically at predetermined intervals by some form of clockwork mechanism or it may be actuated by hand. When a clockwork mechanism is employed the apparatus may be incorporated in a torpedo and will serve to indicate the position of the torpedo automatically. Alternatively, the device may be installed on a submarine or in any other desired position.

The upper limit of the amount of nitric oxide mixed with the phosphine gas is in the neighbourhood of one part in fifty of the phosphine. If a larger proportion of nitric oxide is used than this it will be found that combustion is prevented instead of being ensured. It is preferable to use a much smaller quantity, in the neighbourhood of one part in two hundred or less.

It seems possible that the active agent in igniting the phosphine is nitrogen peroxide ($NO_2$) and that activation by the NO is due to the presence of small quantities of $NO_2$ therein, but it is preferable to use NO as the activating gas because it can be stored under a higher pressure. The presence of minute quantities of $NO_2$ is ensured in practice by the presence of air or oxygen either in the atmosphere or in sea water which comes in contact with the gas before it ignites. It is found desirable to mix the gases immediately before use and not to store them in admixture. This has the special advantage that neither gas is spontaneously inflammable by itself.

The phosphine may be released either from the upper or the lower ends of the cylinder. In the former case it will issue as a gas and in the latter case its release takes place in the form of a liquid but it immediately becomes vapourized owing to the reduction of pressure.

An alternative activator to nitric oxide is very finely divided phosphorus, or a substance producing this in the gas may be used. $P_2H_4$ and $PSF_3$ have also been employed with success. Nitric acid can also be used in the form of a spray. Nitric oxide gas is, however, the most effective substance when release is to take place under water. This body can be used with success at any depth of release. Elementary phosphorus can be dissolved in the phosphine, and the same applies to $P_2H_4$. In using these activators when dissolved in the phosphine release of the phosphine should be effected from below the liquid level in the storage cylinder to ensure that the activator also issues. These dissolved activators appear to retain their efficacy unimpaired indefinitely.

The method may be employed not only for indicating the position of submarine vessels but also for any form of hand or automatic signaling where an effective flame or body of smoke is desirable, whether at sea or otherwise. For example, a buoy or other object, say on becoming adrift, may be indicated by the use of a phosphine cylinder attached to the object concerned and provided with suitable automatic valves. Again shells or other projectiles intended for producing smoke may be filled with the liquid phosphine.

In the manufacture of the phosphine when $P_2H_4$ has been removed, for example, by means such as the carbon dioxide condenser illustrated in Figure 1, it is possible safely to compress the remaining purified phosphine to a liquid condition instead of condensing it by liquid air.

We claim:—

1. A method of producing flame and smoke consisting in releasing phosphine from storage in the liquid state with an activating agent diffused in the phosphine when released so as to be carried therewith into the atmosphere and to ensure combustion.

2. A method of signaling from a submerged object which consists in releasing phosphine under water from the submerged object from storage under pressure with an activating agent diffused in the phosphine when released so as to be carried therewith into the atmosphere and to ensure combustion.

3. A method of signaling from a submerged object which consists in releasing phosphine under water from the submerged object from storage in the liquid state with nitric oxide diffused in the issuing phosphine so as to be carried therewith into the atmosphere and to ensure combustion.

4. A method of signaling from a submerged object which consists in releasing phosphine under water from the submerged object from storage in the liquid state with an active oxygen-containing nitrogen compound diffused in the issuing phosphine so as to be carried therewith into the atmosphere and to ensure combustion.

5. A method of producing flame and smoke which consists in releasing phosphine from storage under pressure with an active oxygen-containing nitrogen compound diffused therein.

6. A method of producing flame and smoke which consists in releasing phosphine from storage in the liquid state with an active oxygen-containing nitrogen compound diffused therein.

7. A method of producing flame and smoke which comprises releasing phosphine from storage under pressure into a mixing chamber, releasing an active oxygen-containing nitrogen compound from storage under pressure into the mixing chamber and causing the resultant mixture of gases to issue to the atmosphere.

8. A method of signaling from a submerged object which comprises releasing phosphine from storage under pressure into a mixing chamber carried by the submerged object, simultaneously releasing nitric oxide from storage under pressure into the said mixing chamber and causing the resultant mixture of gases to issue from the mixing chamber into the water so that it rises to the surface thereof and there ignites.

In testimony whereof we have signed our names to this specification.

CYRIL WILFRED BONNIKSEN.
SYDNEY BARRATT.